Figure 1:
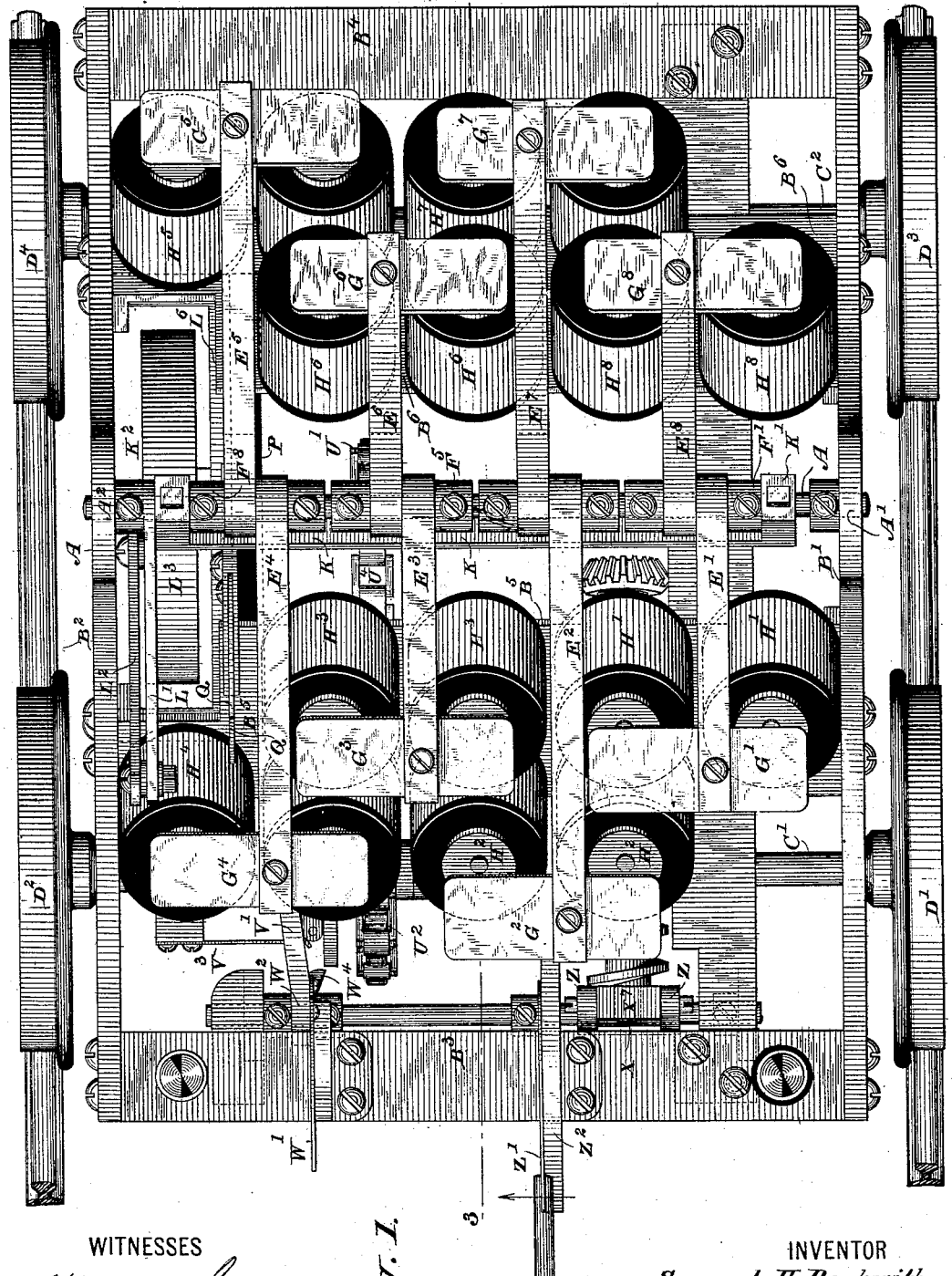

(No Model.) 6 Sheets—Sheet 1.

S. H. BECKWITH.
ELECTRO MAGNETIC LOCOMOTIVE.

No. 280,559. Patented July 3, 1883.

Fig. I.

WITNESSES
Wm A. Skinkle
Edwin A. Newman

INVENTOR
Samuel H. Beckwith
By his Attorneys
Pope Edgecomb & Butler (No Model.) 6 Sheets—Sheet 3.

S. H. BECKWITH.
ELECTRO MAGNETIC LOCOMOTIVE.

No. 280,559. Patented July 3, 1883.

WITNESSES
Wm A. Skinkle
Edwin A. Newman,

INVENTOR
Samuel H. Beckwith
By his Attorneys
Pope Edgecomb & Butler (No Model.) 6 Sheets—Sheet 4.

S. H. BECKWITH.
ELECTRO MAGNETIC LOCOMOTIVE.

No. 280,559. Patented July 3, 1883.

WITNESSES
W<sup>m</sup> A. Skinkle
Edwin A. Newman

INVENTOR
Samuel H. Beckwith
By his Attorneys
Pope Edgcomb & Butler (No Model.) 6 Sheets—Sheet 5.
S. H. BECKWITH.
ELECTRO MAGNETIC LOCOMOTIVE.
No. 280,559. Patented July 3, 1883.
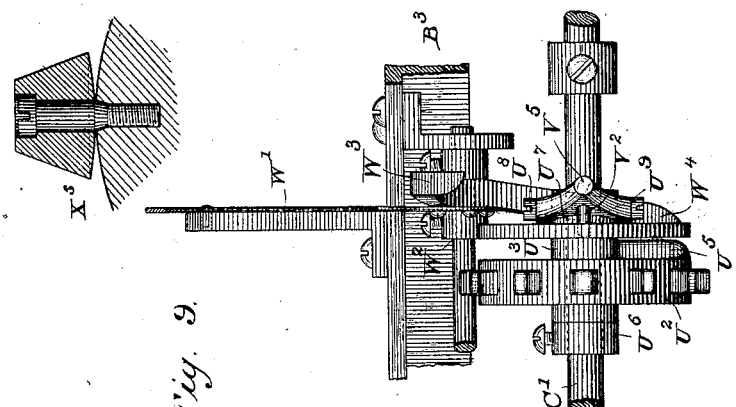
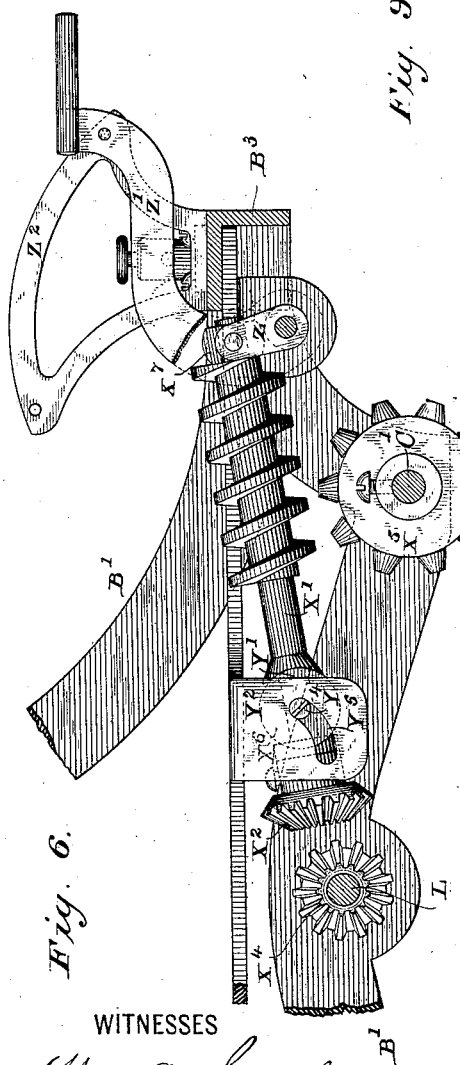
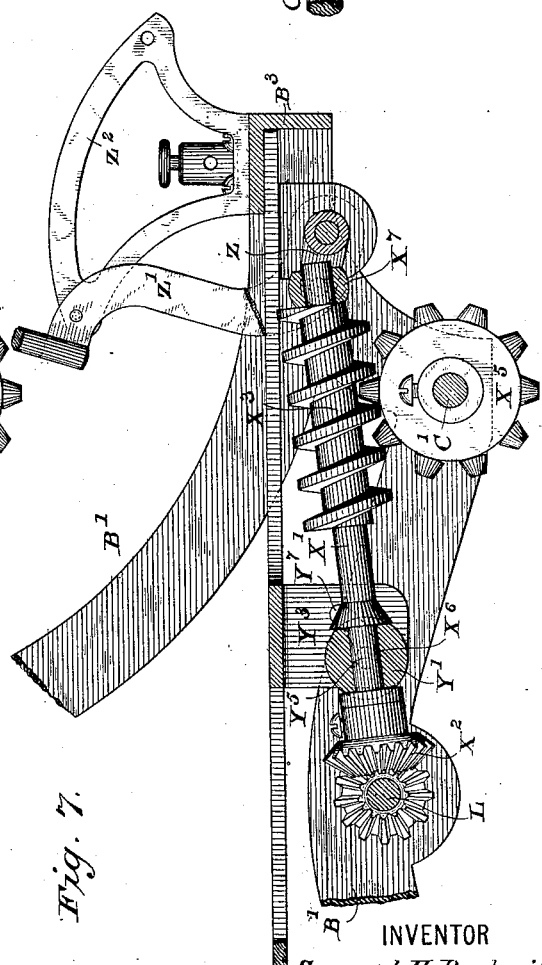
WITNESSES
Wm A. Skinkle
Edwin A. Newman
INVENTOR
Samuel H Beckwith
By his Attorneys
Pope Edgcomb & Butler (No Model.)

6 Sheets—Sheet 6.

S. H. BECKWITH.
ELECTRO MAGNETIC LOCOMOTIVE.

No. 280,559. Patented July 3, 1883.

WITNESSES
Wm A. Skinkle
Edwin A. Newman

INVENTOR
Samuel H. Beckwith
By his Attorneys
Pope Edgecomb & Butler

UNITED STATES PATENT OFFICE.

SAMUEL H. BECKWITH, OF UTICA, NEW YORK, ASSIGNOR TO FRANK J. CALLANEN, OF SAME PLACE.

ELECTRO-MAGNETIC LOCOMOTIVE.

SPECIFICATION forming part of Letters Patent No. 280,559, dated July 3, 1883.

Application filed January 5, 1883. (No model.)

*To all whom it may concern:*

Be it known that I, SAMUEL H. BECKWITH, a citizen of the United States, residing at Utica, in the county of Oneida and State of New York, have invented certain new and useful Improvements in Electro-Magnetic Locomotives, of which the following is a specification.

My invention relates to that general class of electrical appliances commonly denominated "electromotors," which have for their object the conversion of electric currents into mechanical force. It particularly relates to such forms of electromotors as are designed for purposes of railway locomotion.

The object of my invention is to provide a serviceable and inexpensive motor for railway purposes and actuated by electrical currents, preferably from a stationary generator.

My invention especially concerns the following features of an electric locomotive: first, the motor mechanism for causing the rotation of the main shaft of the locomotive through the agency of the electrical currents; second, the commutator mechanism by which the electrical currents are distributed to said motor mechanism; third, the intermediate gearing whereby the power is communicated from the motor mechanism to the driving-wheels of the locomotive. These several features, as embodied in my improved locomotive, may be generally described as follows:

First. The motor mechanism comprises a convenient number of electro-magnets, arranged symmetrically in two rows or series, one row or series on either side of a transverse central rock-shaft. Each electro-magnet is confronted by an armature, and each armature is carried by an armature-lever arbored loosely upon said rock-shaft. The rock-shaft is further provided with a number of cams, one for each armature-lever, through the agency of which certain movements of the armature-levers, due to the attraction of the magnets for their respective armatures, are communicated to said rock-shaft. The cams, like the armatures, are disposed in two series, and the cams in each series are adjusted to different angular positions with reference to the rock-shaft, so that the impulses given by the armature-levers to the rock-shaft may be successive rather than simultaneous. When, therefore, the individual electro-magnets of one series are consecutively vitalized, a partial rotation of the rock-shaft in one direction is produced, which continues until all the armatures of that series have been drawn to the poles of their respective magnets. If, then, the currents be passed in like manner consecutively through the magnets of the other series, a corresponding oscillation in the opposite direction may be produced. These alternating oscillations of the rock-shaft are communicated by a crank and pitman to the main shaft of the locomotive.

Second. The commutator or distributing mechanism, whereby the incoming electric current may be first directed successively through the magnets of one series and then successively through those of the other, is so constructed that a complete cycle of operations will be performed with each revolution of the main shaft. The commutator comprises a disk of non-conducting material, upon the surface of which are symmetrically disposed as many contact-points or segments as there are electro-magnets in both series, the exact number of which in any particular machine is immaterial. The incoming current is conveyed to these contact-points by means of a contact spring or brush or other suitable circuit-closing device carried by the main shaft, and coming successively into electric connection with each contact-point as said shaft is rotated. The commutator is also provided with a device by which the direction of the rotation of the main shaft may be reversed, so that a movement of the locomotive can be produced in either direction at will.

Third. The power may be communicated to the driving-wheels of the locomotive by either of two independent gearing devices. First, by a chain-and-pulley mechanism for imparting motion to a wheel loosely mounted upon the driving-wheel axle, in combination with a locking device or clutch, by the operation of which the motion of this wheel may be imparted to the driving-wheel axle. This mechanism is designed for the ordinary working of the electric engine when running on an approximately level track. For ascending grades where more effective propelling-power is required, I provide a second gearing device— namely, a stout beveled gearing of small leverage, through the medium of which a subsidiary shaft may be rotated from the main shaft. The power is transmitted from the subsidiary shaft to the driving-wheel axle through the medium of an endless screw and pinion mechanism.

My invention also includes certain details of construction, the particular subject-matter claimed being hereinafter specifically designated.

Figure 2:
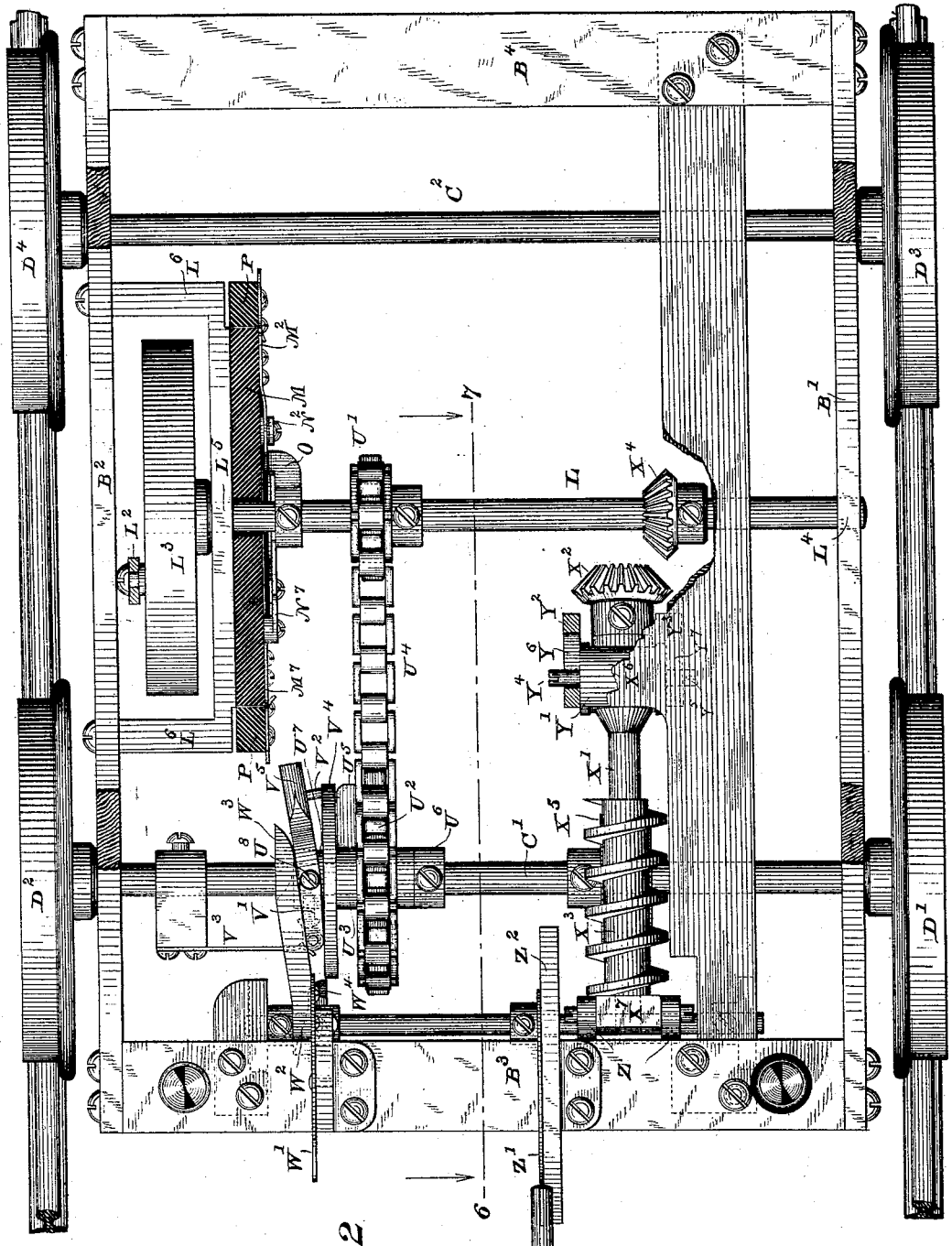
Figure 3:
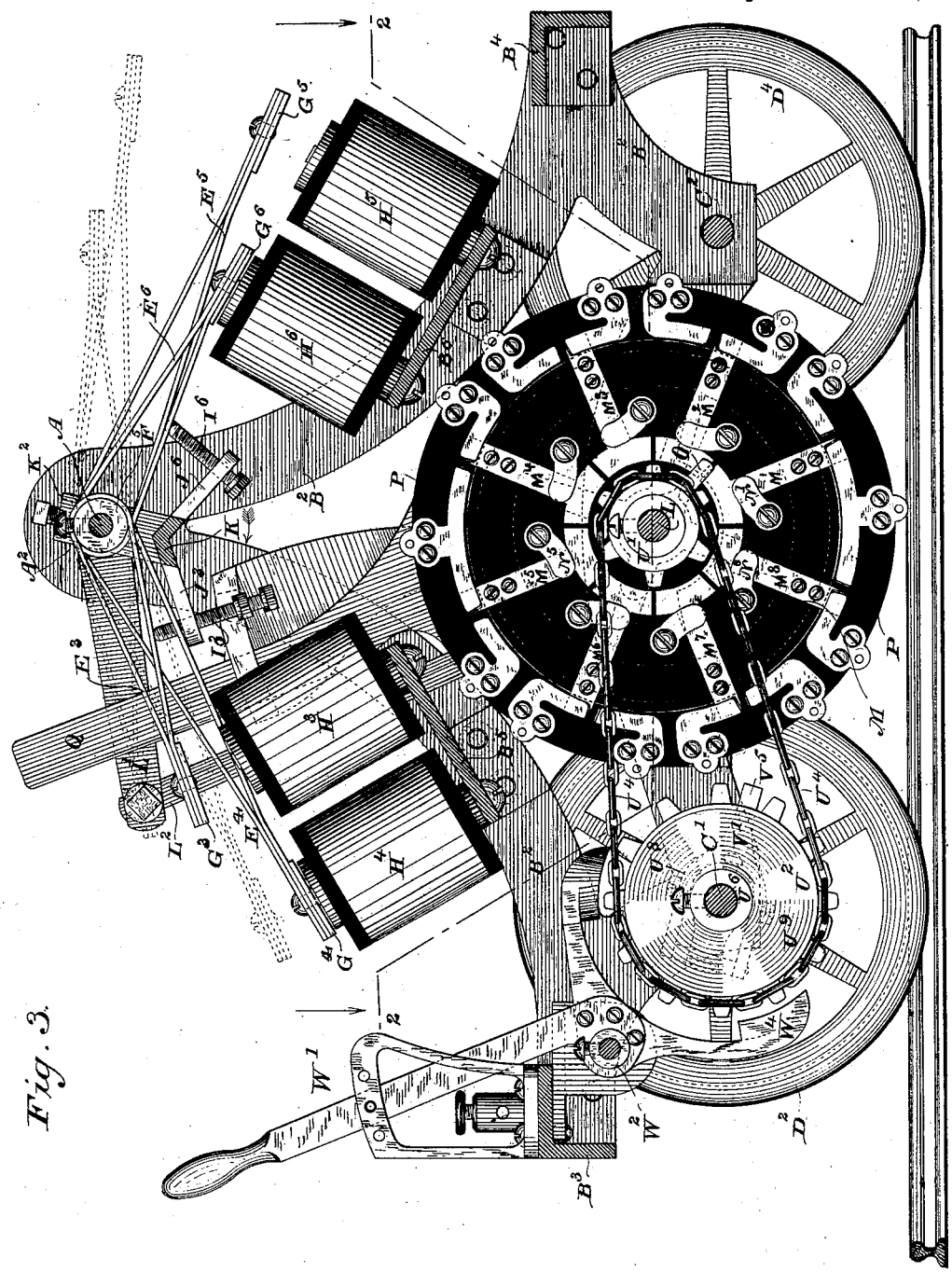
Figure 5:
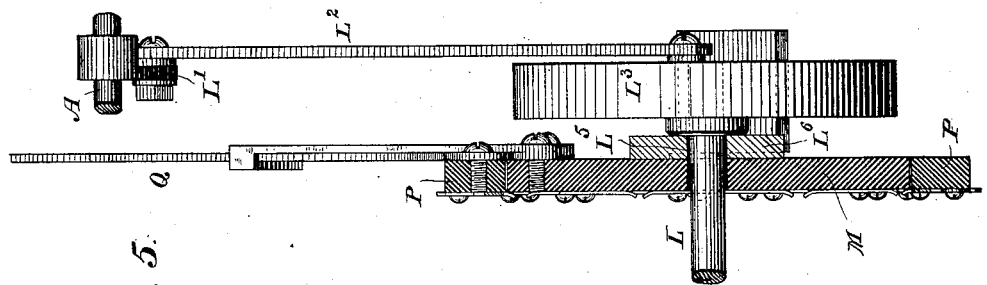
Figure 4:
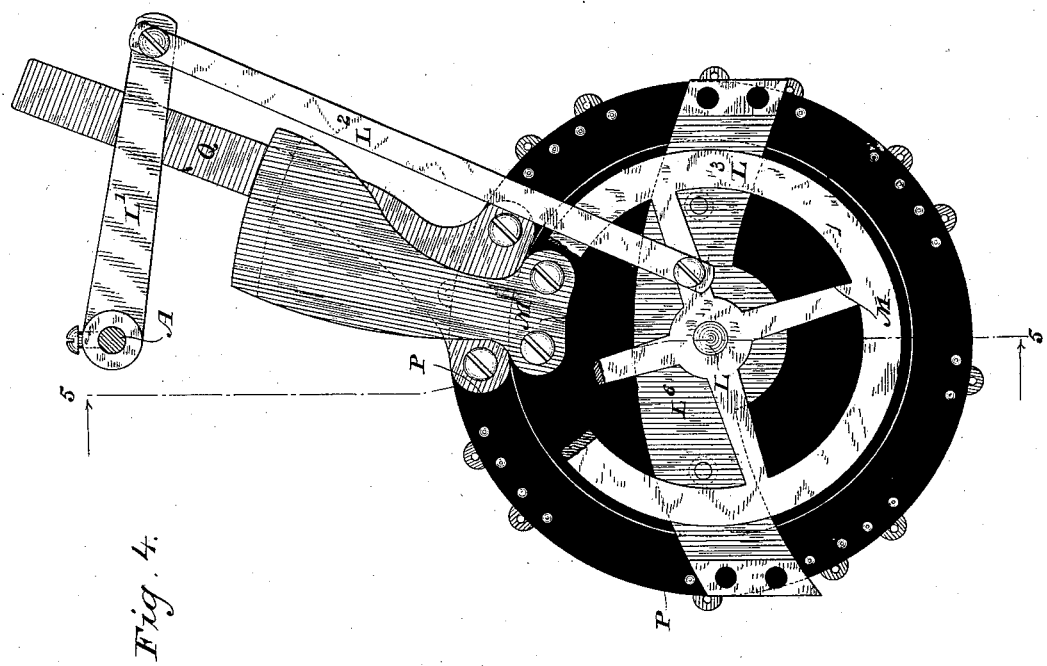

My invention is set forth in the accompanying drawings, in which Figure 1 is a plan view of the locomotive. Fig. 2 is a horizontal section on the line 2 2 of Fig. 3, which latter view is a longitudinal section on the line 3 3 of Fig. 1. Fig. 4 is an outside rear face view of the commutator mechanism. Fig. 5 is a transverse section thereof on the line 5 5 of Fig. 4. Figs. 6 and 7 are detached views on the line 6 7 of Fig. 2, showing the mechanism for communicating movements of the main shaft to the driving-wheel axle when the locomotive is used upon ascending grades, the former showing said mechanism when out of action, the latter when in action. Figs. 8 and 9 exhibit parts of the communicating gearing used for approximately level driving. Figs. 10, 11, 12, and 13 are theoretical diagrams designed to explain the action of the electro-magnetic motor device.

Referring to the figures, A is a rock-shaft, turning in bearings A' and A² in the frame-work of the motor. This frame-work is rectangular in plan, as seen in Fig. 1. It is composed of two similarly-shaped side pieces, B' and B², connected together at either end by heavy transverse girders B³ and B⁴. The full contour of one of these side pieces—namely, B²—is presented in Fig. 3, by referring to which it will be seen that the side pieces are provided with central elevated portions, in which said bearings A' and A² are located, thus elevating the rock-shaft A above the other parts of the mechanism. These side pieces also support the journals of the shafts C' and C², upon which the flanged wheels D' D² D³ D⁴ are mounted.

A number of levers, E' to E⁸, are loosely mounted on the rock-shaft A and held in place by the adjustable collars F' to F⁸. Each lever E carries at its outer extremity an armature, G, and each armature confronts the poles of an electro-magnet, H. These magnets are affixed to transverse rafters B⁵ and B⁶, which also serve to strengthen the frame-work of the locomotive.

In addition to the armature-levers E, the rock-shaft A carries a system of adjustable cams, each cam being composed of a screw, I, traversing a bracket or extension piece, J, which extends from a frame-work, K, rigidly attached to said rock-shaft at points K' and K². I have shown eight cams, such as described, respectively situated immediately beneath the eight armature-levers to which they individually correspond. These cams may be adjusted by merely turning the screws I up or down. In practice I give to each screw of either series a different adjustment—that is to say, such that its point will not be in the same horizontal plane with any other screw-point in the series to which it belongs. Accordingly, when the shaft A is rocked a sufficient distance in either direction, one series of cams will be elevated, and the cams of that series will communicate their motion to the armature-levers, and thus cause the elevation of the armatures to positions determined by the adjustment of the several screws. Thus, let it be assumed that the armatures G⁵ to G⁸, inclusive, are brought, respectively, into proximity to the poles of the magnets H⁵ to H⁸. This will cause a displacement of the frame-work K, supporting the cams, in the direction of the arrow, which will cause the armature G' to be elevated by the screw I' a short distance above the poles of the magnet H'. Owing to the difference of adjustment between the screw-points, the armature G² will be elevated, say, twice that distance above the pole of the magnet H². Similarly, the armatures G³ and G⁴ will be elevated, say, three and four times that distance above the poles of the magnets H³ and H⁴, respectively. Again, when the armatures G' to G⁴ are brought in contact with the poles of the magnets H' to H⁴, respectively, the shaft A will be rocked in the reverse direction to that indicated by the arrow, and the armatures H⁵ to H⁸ will be elevated by the screws I⁵ to I⁸, respectively, above the poles of the magnets G⁵ to G⁸, in a manner corresponding to that described above.

In operating the motor the actuating electric current is directed (by a commutator mechanism, to be hereinafter described) successively through the coils of the electro-magnets H' to H⁸, preferably in the order of their designating-numbers, as indicated in the drawings. The effect of thus successively vitalizing the electro-magnets of one series is to rock the shaft A in one direction (by virtue of the pressure exerted by the armature-levers upon the cams) through four approximately equal fractions of a revolution. This will cause the elevation of the armatures of the second series in the manner described, so that the successive vitalization of the magnets of said second series will cause a corresponding rotary movement of the rock-shaft in the opposite direction. Thus, by successively transferring the current from one magnet to another, the rock-shaft may be partially oscillated in first one and then the opposite direction with uniformity and by virtue of a series of eight consecutive impulses for each oscillation. These movements of the rock-shaft A are communicated to a main shaft, L, by means of the arm L', pitman L², and fly-wheel L³. The shaft L is journaled at L⁴ in the side piece B' of the frame-work, and at L⁵ in an extension-bracket, L⁶, of the side piece B². The side piece and bracket together form an opening, within which the fly-wheel L³ is placed.

Figure 10:
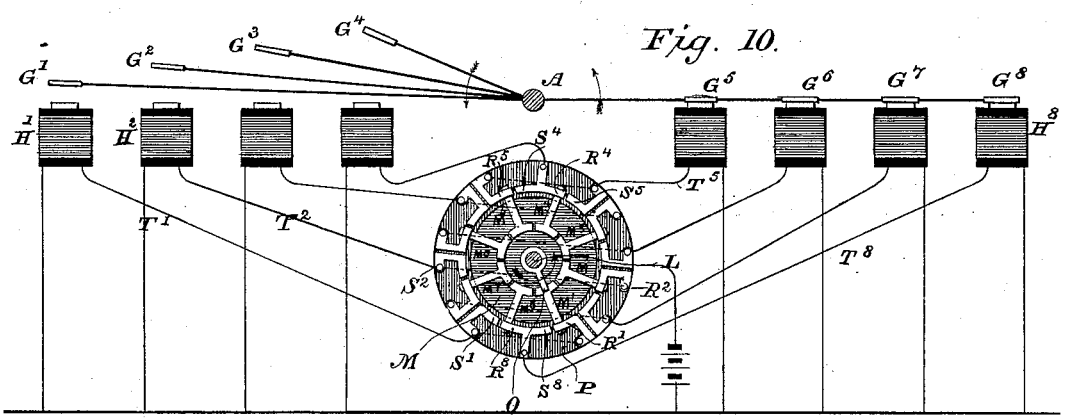
Figure 11:
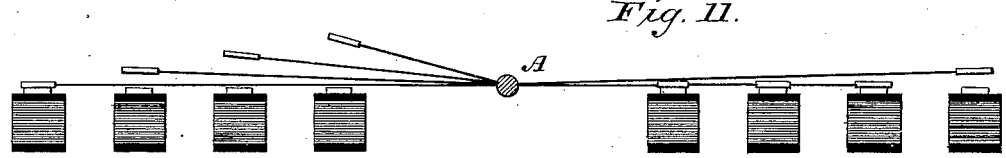
Figure 12:
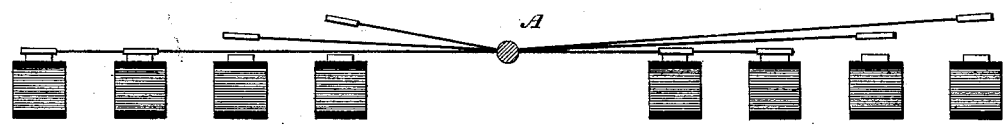
Figure 13:
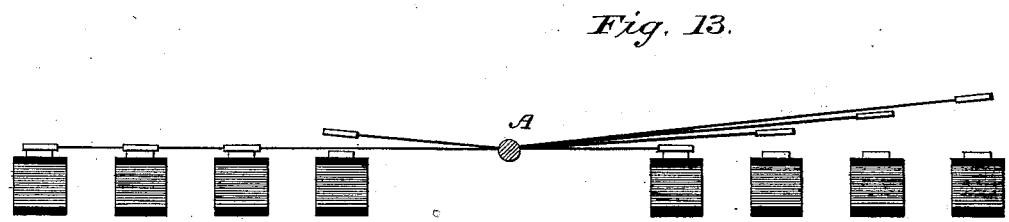

The distributing or commutator mechanism, through the agency of which the current is conveyed successively to the electro-magnets H, may be described as follows: The main shaft L carries a non-conducting disk, M, (see Figs. 3, 4, 5, and 10.) Upon the face of this disk are secured a series of flat metallic springs, M' to M$^8$. These springs are fastened at equidistant points near the periphery of the disk, and extend radially inward toward the central shaft. The inner ends of the springs are expanded into curved segments, which together form a circle of metallic contact-points, separated from each other by narrow non-conducting intervals or spaces. The springs bear away from the commutator-disk, and their movement in that direction is limited by the overlapping stops N' to N$^8$. The shaft L is provided with a contact spring or brush, O, which, as the shaft revolves, makes contact successively with the segments of the radial springs M' to M$^8$, and presses back each segment from its stop N as its makes contact therewith, so as to insure perfect electric connection. The outer ends of the radial springs extend beyond the disk M, and in front of the face of an annular disk, P, also of non-conducting material, which surrounds the disk M, and is mounted upon its periphery, so that it may be partially turned about the disk M in either direction by means of the lever Q. The disk P is provided with eight pairs of contact-points, R and S. Each pair co-operates with one of the radial springs, M, which may be brought into contact with either contact-point of the pair by giving a partial revolution to the disk P. The contact-points of each pair are in electrical connection with each other by means of suitable conductors, and each pair of points corresponds to and is in the electrical circuit of one of the electro-magnets, H. With the system thus organized, whenever the radial springs are in electrical connection with the contact-plates R, a suitable current entering by the main shaft L and circuit-closer O will produce motion of the main shaft in one direction by causing the successive actuation of the magnets in the order of their designating-numbers. If now the annular disk P be turned so as to bring the radial springs into contact with the points S, a rotation of the circuit-closer in the opposite direction will still cause the actuation of the magnets in the order of their designating-numbers, but will reverse the direction of rotation of the main shaft. This organization is clearly set forth in Fig. 10, in which it will be seen that the radial springs M' to M$^8$, inclusive, are in contact, respectively, with the points R' to R$^8$. A conductor, T, leads from each magnet to a contact-plate, S, and thence to the corresponding contact-plate, R. Thus the conductor T' from magnet H' communicates with contact-points S$^1$ and R$^1$. The conductor T$^2$ connects magnet H$^2$ with contact-points S$^2$ and R$^2$, &c. The circuits are severally completed through contact-springs M, circuit-closer O, axle L, ground-wire, and battery, as will be understood by reference to Fig. 10. A revolution of the main shaft L in the direction designated by the arrow will therefore cause, first, an actuation of electro-magnet H', secondly, of the electro-magnet H$^2$, thirdly, of the electro-magnet H$^3$, and so on in rotation to H$^8$. This causes the rocking of the shaft A in the manner already described, and insures the continuous rotation of the main shaft L when the motion has been once established. Fig. 10 shows the relative positions of the several armatures G' to G$^8$ when the circuit-closer O is in contact with the radial spring M'. The positions successively assumed by the armatures as the circuit-closer in advancing makes contact with the radial springs M$^2$, M$^3$, and M$^4$, are illustrated, respectively, in Figs. 11, 12, and 13, which require no further explanation. With the commutator in this phase it will be seen that it is impossible to establish motion in the opposite direction, for such motion would actuate the magnets in the reverse order of their designating-numbers, to which order their armatures are not arranged to respond. If now the annular disk be turned, so as to bring the radial springs M' to M$^8$ into contact with the points S' to S$^8$, respectively, a motion in the reverse direction to that shown by the arrow will be produced, and by tracing the connections it will be seen that such motion will cause the actuation of the magnets in the order of their designating-numbers as before, while motion in the opposite direction will be impracticable. Thus, by suitably operating the reversing-lever Q, a continuous motion of the main shaft L in either direction may be maintained.

The mechanism which I have devised for communicating the power from the shaft L to the driving-wheels D' and D$^2$ may be particularly described as follows: Referring especially to Fig. 2, it will be seen that the shaft L carries a sprocket-wheel or pulley, U', rigidly attached thereto. The shaft C' of the driving-wheels D' and D$^2$ also carries a second sprocket-wheel, U$^2$, having a hub, U$^3$, loosely mounted upon the shaft. The motion of the wheel U' is communicated to the wheel U$^2$ by means of the chain U$^4$. The sprocket-wheel U$^2$ is provided upon one of its faces with an extension-piece or cam, U$^5$, projecting radially from the hub U$^3$. The latter is kept in position upon the shaft C' by the collars U$^6$ on one side and U$^7$ on the other. Upon the latter, at points U$^8$ and U$^9$, diametrically opposite each other, a forked lever, V', is fulcrumed. This lever carries a detent, V$^2$, which may be moved into or out of the path of the cam U$^5$, being retained in either position by the action of a set-spring, V$^3$. To give greater strength to the mechanism, I prefer to have the detent V$^2$ traverse a slot in a disk, V$^4$, carried by the collar U$^7$. The position of the detent may be at any time regulated by operating a mechanical shifter, which consists of a lever, W', pivoted at W$^2$, and provided with forks W$^3$ and W$^4$, which may be separately moved into the paths of revolution of the handle V⁵ of the forked lever V'. The ends of the forks W³ and W⁴ are beveled, so as to give to the handle V⁵ a deflection in one direction or the other, as determined by the particular fork, and thus shift the detent into engagement with the cam U⁵ or into a position of non-engagement. When in position of engagement, the movements of the wheel U² will be communicated to the driving-axle C' and driving-wheels D' and D². This is the arrangement which I propose to employ whenever it is desired to use the locomotive upon practically level sections of track.

If it be desired to employ the locomotive upon inclined tracks, it will be convenient to resort to a communicating gear mechanism, whereby greater mechanical advantage may be obtained, and which is more fitted to resist the additional strain necessarily brought to bear upon its parts. I have therefore provided a subsidiary shaft, X', carrying at one end a beveled-gear wheel, X², and at the other a screw or worm, X³. There is also provided a beveled-gear wheel, X⁴, carried by the shaft L, and a worm-wheel, X⁵, carried by the shaft C'. The shaft X' is arbored in bearings X⁶ and X⁷, both of which are movable in the same vertical plane. A shifter, Z, is also provided, by which the shaft X' may be advanced, so as to bring the beveled-gear wheels into co-operation, and at the same time bring the screw X³ into co-operation with the toothed wheel X⁵. The particular form of tooth which I prefer to use upon this wheel is shown in Fig. 9. It consists of a truncated cone of metal, secured by means of a central screw or pin, upon which it turns, to the surface of the wheel. The bearing X⁶ consists of a perforated block, Y', carried between two plates, Y² and Y³, upon pivots Y⁴ and Y⁵, and sliding in slots Y⁶ and Y⁷, respectively. The subsidiary shaft X' is advanced and withdrawn by means of the mechanical shifter Z', which may be set in a forward or back position by means of the usual rack, Z².

It is evident that the mechanism herein described, actuated by a system of eight electro-magnets, may be modified as regards the number of magnets and as regards many of the details of construction without departing in any essential particular from the principles of this invention.

I claim as my invention—

1. The combination, substantially as hereinbefore set forth, of a series of electro-magnets, a series of commutator-segments electrically connected with the said electro-magnets, and a series of movable electric switches for simultaneously transferring the connection of each electro-magnet from one commutator-segment to the next adjacent one.

2. The combination, substantially as hereinbefore set forth, of the commutator-segments mounted upon a non-conducting disk, a series of electro-magnets, and a series of switches mounted upon a non-conducting ring surrounding said disk, said switches being interposed between the commutator-segments and the electro-magnets.

3. The combination, substantially as hereinbefore set forth, of a rock-shaft, two series of electro-magnets, a series of armatures—one for each electro-magnet—acting upon said rock-shaft through the intervention of levers, and means for varying or adjusting the angular position of each lever upon the rock-shaft with reference to the others.

4. The combination, substantially as hereinbefore set forth, of a central disk, a series of radial contact-springs, a traveling circuit-closer, making successive contacts with said springs when moving in one direction or the other, an annular disk mounted upon the periphery of said central disk, and two systems of contact-points upon said annular disk, either of which may be put into connection with said springs, and a system of electro-magnets and electrical conductors by which the current may be directed successively through said electro-magnets in the same order regardless of the direction of the movement of said circuit-closer.

5. The combination, substantially as hereinbefore set forth, of a central disk, a shaft traversing said disk, a circuit-closer carried by said shaft, a circular system of contact-points mounted upon the face of said disk, and means whereby the motion of said circuit-closer in either direction may successively direct an electrical current through a series of magnets in the same order regardless of the direction of motion.

6. The combination, substantially as hereinbefore set forth, of a central disk, a central shaft, a circuit-closer carried by said shaft and movable in either direction, a system of contact-springs arranged radially upon said disk and bearing away from its surface, overlapping stops for limiting the outward movement of said springs, two systems of contact-points which may be severally brought into connection with the outer ends of said springs, and conductors by which the currents conveyed to said outer system of contact-stops by the movements of said circuit-closer in either direction may be directed successively through a series of magnets in a given order.

7. The combination, substantially as hereinbefore set forth, of a rock-shaft, means by which said rock-shaft may be oscillated by successively vitalizing the series of electro-magnets in a given order, and means whereby a rotating circuit-closer may thus vitalize said magnets regardless of the direction of rotation.

In testimony whereof I have hereunto subscribed my name this 29th day of December, A. D. 1882.

SAMUEL H. BECKWITH.

Witnesses:
FRANK J. CALLANEN,
FRANK D. WESTCOTT.